United States Patent
Broome

(10) Patent No.: US 9,076,139 B2
(45) Date of Patent: Jul. 7, 2015

(54) APPARATUS FOR THE DELIVERY OF A PRODUCT

(71) Applicant: MICROS SYSTEMS UK LIMITED, Slough Berkshire (GB)

(72) Inventor: Paul Broome, London (GB)

(73) Assignee: Micros Systems UK Limited, Slough (GB)

( * ) Notice: Subject to any disclaimer, the term of this patent is extended or adjusted under 35 U.S.C. 154(b) by 0 days.

(21) Appl. No.: 14/236,891

(22) PCT Filed: Apr. 10, 2013

(86) PCT No.: PCT/GB2013/050916
§ 371 (c)(1),
(2) Date: Feb. 3, 2014

(87) PCT Pub. No.: WO2013/153378
PCT Pub. Date: Oct. 17, 2013

(65) Prior Publication Data
US 2014/0207277 A1 Jul. 24, 2014

(30) Foreign Application Priority Data
Apr. 11, 2012 (GB) .................................. 1206369.9

(51) Int. Cl.
*G06K 15/00* (2006.01)
*G06Q 20/32* (2012.01)
*G07F 11/00* (2006.01)
*G07F 13/02* (2006.01)
*G06Q 10/02* (2012.01)

(52) U.S. Cl.
CPC ............. *G06Q 20/322* (2013.01); *G06Q 20/32* (2013.01); *G06Q 20/325* (2013.01); *G06Q 20/3276* (2013.01); *G07F 11/002* (2013.01); *G07F 13/025* (2013.01); *G06Q 10/02* (2013.01)

(58) Field of Classification Search
USPC .......................................... 235/379, 381, 383
See application file for complete search history.

(56) References Cited

U.S. PATENT DOCUMENTS

| | | | | |
|---|---|---|---|---|
| 4,247,899 | A * | 1/1981 | Schiller et al. ................ | 705/413 |
| 5,719,781 | A * | 2/1998 | Leatherman et al. ......... | 700/232 |
| 6,176,421 | B1 * | 1/2001 | Royal et al. .................... | 235/381 |
| 6,360,141 | B1 * | 3/2002 | Jensen .......................... | 700/237 |
| 6,535,726 | B1 * | 3/2003 | Johnson ........................ | 455/406 |
| 7,774,231 | B2 * | 8/2010 | Pond et al. ..................... | 705/15 |
| 2006/0271431 | A1 * | 11/2006 | Wehr et al. ..................... | 705/14 |

(Continued)

FOREIGN PATENT DOCUMENTS

| | | |
|---|---|---|
| EP | 1 168 257 | 1/2002 |
| EP | 1 184 241 | 3/2002 |

(Continued)

*Primary Examiner* — Tuyen K Vo
(74) *Attorney, Agent, or Firm* — Miles & Stockbridge P.C.

(57) ABSTRACT

An apparatus for the delivery of a product having a delivery outlet, a delivery control device, a remote command device, and a mobile communications device is disclosed. The delivery control device is connected to the remote command device via a communications network and is adapted to activate the delivery outlet when in receipt of an activation signal from the remote command device. The mobile communications device is connectable to the remote command device via a communications network. The remote command device is adapted to send the activation signal to the delivery control device when in receipt of an activation request signal from the mobile communications device.

19 Claims, 9 Drawing Sheets

(56) References Cited

U.S. PATENT DOCUMENTS

| | | |
|---|---|---|
| 2008/0154735 A1 | 6/2008 | Carlson |
| 2008/0235105 A1* | 9/2008 | Payne et al. .................... 705/26 |
| 2008/0308628 A1* | 12/2008 | Payne et al. .................. 235/381 |
| 2010/0023162 A1* | 1/2010 | Gresak et al. ................. 700/241 |
| 2014/0351138 A1* | 11/2014 | Frieden et al. ................. 705/44 |

FOREIGN PATENT DOCUMENTS

| | | |
|---|---|---|
| EP | 1 335 333 | 8/2003 |
| WO | WO 01/11858 | 2/2001 |
| WO | WO 02/052202 | 7/2001 |
| WO | WO 02/11087 | 2/2002 |
| WO | WO 2011/153379 | 12/2011 |

* cited by examiner

APPARATUS FOR THE DELIVERY OF A PRODUCT

This Application is the U.S. National Phase of International Application Number PCT/GB2013/050916 filed on Apr. 10, 2013, which claims priority to European Patent Application No. 1206369.9 filed on Apr. 11, 2012.

This invention relate to apparatus for the delivery of a product, for use particularly, but not exclusively, to deliver vehicle fuel.

Fuel for vehicles is commonly delivery at road side stations comprising several pumps. A user parks his vehicle alongside a pump, and manually operates it to deliver fuel to his vehicle. Traditionally a user pays for the fuel dispensed after the delivery has taken place. However, due to the rise in users dispensing fuel and then leaving the station without paying, it is now common for fuel stations to require either pre-payment, or a payment authorisation before delivery.

It is usually necessary to pay for fuel at a payment counter spaced from the pumps. This can be inconvenient at busy times when users must queue to pay. To overcome this problem it is now known to provide a payment mechanism at the pump itself. This commonly comprises a payment card reader, which can be used to either pre-pay for a particular quantity of fuel before it is dispensed, or to make a payment authorisation before delivery. Payment authorisations involve authenticating the payment card and authorising the dispensing of a maximum quantity of fuel, and then charging an appropriate amount to the payment card after a particular quantity of fuel has been dispensed. However, such pump based payment mechanisms are expensive because they have to be very robust to be able to survive outside in extremes of weather and temperature. The cost issue is exacerbated when fuel stations comprise several fuel pumps and each has to be provided with such a mechanism.

Fuel stations can turnover very large amounts of revenue, in particular if they are large and in a busy location. Payment cards are a common method of payment because the value of fuel purchased often exceeds a value which it would be convenient or safe to carry in cash. As such, fuel stations are a prime target for payment card fraud schemes, in which payment card details are stolen and used to forge fake payment cards. This can be achieved using a fake payment card reader.

The present invention is intended to overcome some of the above problems.

Therefore, according to the present invention, apparatus for the delivery of a product comprises a delivery outlet, delivery control means, remote command means and a mobile communications device, in which the delivery control means is connected to the remote command means via a communications network, and is adapted to activate the delivery outlet when in receipt of an activation signal from said remote command means, in which the mobile communications device is connectable to the remote command means via a communications network, and in which the remote command means is adapted to send said activation signal to said delivery control means when in receipt of an activation request signal from said mobile communications device.

Thus, the present invention provides apparatus which allows for fuel to be purchased by means of a mobile phone based financial transaction. The mobile communications device referred to above can be a mobile telephone comprising an application program designed to allow an internet based financial transaction to be performed, for example through a website such as Paypal® or the like. Once the transaction is complete the application program can then send the activation request signal to the remote command means, which can be a service provider's server accessible via the internet and/or a mobile telecommunications network. It can then send the activation signal via a standard internet connection to the delivery control means, which can be a computer which controls a fuel pump. Such an apparatus allows for a fuel to be paid for in advance, or for a payment authorisation to be performed, which addresses the issue of users delivering fuel to their vehicles without paying. It also allows the transaction to take place at the pump, or even from within the customer's vehicle, which avoids the inconvenience of having to attend a payment counter spaced from the pump. Further, it does this without any requirement for an expensive outdoor card reader to be incorporated into the pump. In addition, such apparatus also avoids the dangers associated with using payment card readers in fuel stations which might be fake, as it relies instead on a financial transaction taking place on a secure website such as Paypal®.

There are many ways the apparatus of the invention can be arranged, and in particular on which parts thereof the various functions can be hosted. For example, in one version of the invention the remote command means can be a unitary part of the apparatus which can host the financial transaction and send the activation signal to the delivery control means once it is complete. In another version of the invention the apparatus can comprise a separate remote transaction means, and the remote command means can access it, or allow the user to do so therethrough via the mobile communications device. However, in a preferred construction the mobile communications device can separately access a remote transaction means, and then return to the remote command means once the financial transaction is complete.

Therefore, the apparatus can comprise a remote transaction means, the mobile communications device can be connectable to the remote transaction means via a communications network, the remote transaction means can be adapted to send a confirmation signal to said mobile communications device when in receipt of a transaction request signal from said mobile communications device, and the mobile communications device can be adapted to only send said activation request signal to said remote command means when in receipt of said confirmation signal.

The transaction request signal can form a part of any known electronic communication mechanism used to perform an on-line financial transaction. These are widely known, and usually involve the transmission of various packets of data both ways over the internet. The transaction request signal can comprise the usual packets of data a user would have to send to a remote transaction means to facilitate the transaction, including data comprising a user name, password, PIN, or any other device for confirming identity. The remote transaction means can then check this against user data in a database to confirm that the transaction can take place.

Therefore, preferably said remote transaction means can comprise a database of user data, said transaction request signal can comprise user identification data, and said transaction means can be adapted to compare said user identification data with user data in said database, and to only send said confirmation signal to said mobile communications device if said user identification data matches user data in said user database.

Online financial transactions are usually limited or controlled in some way. For example, a user may only have a particular credit or debit limit, or there may be a time delay necessary between transactions to prevent fraud. Further, a user must send data which involves a request to purchase a particular product, which includes identifying the vendor, the product or a particular value of product, for example £50 of petrol from a particular fuel company. This kind of data can be manually inputted into the mobile communications device by the user, but preferably an application program running on the mobile communications device can provide for such data to be automatically generated once the user has identified the product he wishes to purchase, either by manually inputting it, or by identifying it in some other way, for example using a barcode or the like. When purchasing fuel this can involve identifying a particular fuel pump, and then manually inputting the value of fuel desired.

Therefore, preferably the database of user data can further comprise user permission protocols, said transaction request signal can comprise user request data, and said transaction means can be adapted to compare said user request data with said user permission protocols, and to only send said confirmation signal to said mobile communications device if said user request data complies with a corresponding user permission protocol.

As the transaction means is accessed directly by the mobile communications device separately from the remote command means, once the financial transaction has been successfully completed this needs to be communicated to the remote command means so it can activate the delivery outlet accordingly.

Therefore, the user request data can comprise a product request value; the confirmation signal, the activation request signal and the activation signal can all comprise a product supply value, and the delivery control means can be adapted to activate the delivery outlet only according to said product supply value.

In one construction said confirmation signal, said activation request signal and said activation signal can all comprise said user identification data and said user request data. This allows for information about the customer and the purchase to be communicated to the vendor, who can access it from the delivery control means. The activation signal will serve to facilitate the actual delivery of the product for the customer, for example fuel from a fuel pump, and the user identification data and user request data are not required for this function. However, such data is required in order to product a receipt, and to track sales to particular customers, for example for a reward scheme or the like. It also allows for very useful sales data to be compiled for later analysis. Such data can be kept by the vendor, or made available to the customer.

In one embodiment of the invention the delivery outlet can be manually operable to deliver product, and the delivery control means can comprise product delivery monitoring means. If the product delivery monitoring means detects that the delivery outlet has been manually operated to deliver less product than said product supply value, the delivery control means can be adapted to send a report signal comprising a product surplus value to said remote command means. Further, said remote command means can be connectable to said remote transaction means via a communications network, and said remote command means can be adapted to forward said product surplus value to said remote transaction means.

It will be appreciated that if the invention is used to facilitate the purchase of a product such a vehicle fuel, for which a particular value of product is purchased before it must then be manually taken, there exists the possibility that the all the product which has been purchases is not taken for whatever reason. This could be the case if more vehicle fuel than can be stored in a vehicle is purchased. Therefore, with the above arrangement any surplus product which is not taken is identified, and this is communicated to the remote transaction means so that a refund to the customer can be made.

Alternatively, this arrangement also allows for a payment authorisation arrangement like those which are known. In such situations a user's financial account is not debited when they first make the purchase request, rather an authorisation is provided for product up to a certain value to be purchased. The delivery is then monitored, and the actual value taken is then debited from the user's financial account. This kind of arrangement finds particular application with the purchase of vehicle fuel because in many cases users simply want to fill their vehicle with the maximum quantity of fuel possible, the value of which is not known. Therefore, the product request value can be automatically set at a nominally large enough sum to cover most vehicle fuel purchases, for example £100, and the user's financial account will then only be debited for this sum minus the product surplus value, after said remote command means has sent this information to the remote transaction means. This eliminates the need for the user to input an amount of vehicle fuel they wish to purchase, and instead they simply obtain authorisation from the remote transaction means and then proceed with the delivery of fuel.

It will be appreciated that the invention will work with just one delivery outlet, but it is not likely that such an arrangement would find practical application. Therefore, the apparatus can comprise a plurality of delivery outlets, each comprising a unique identifier, and the apparatus can comprise a database of said plurality of delivery outlets. (The database can be hosted by the remote command means, but it can also be dispersed between the remote command means and the delivery control means, when the delivery control means controls more than one delivery outlet, as explained further below.) Said mobile communications device can be adapted to allow for a unique identifier to be inputted and included in a reservation request signal, and the remote command means can be adapted to send a reservation signal to the delivery outlet comprising that unique identifier when in receipt of said reservation request signal from said mobile communications device.

With this arrangement a chosen delivery outlet can be reserved for a user before they then conduct the financial transaction with the remote transaction means. This finds particular application with the purchase of vehicle fuel, because a user can park their vehicle alongside a particular fuel pump, and then reserve it for themselves. This prevents a user from ever inadvertently purchasing fuel from a pump which is already being used by another customer, or from inadvertently purchasing fuel from a different pump to that they are parked next to.

Vehicle fuel stations commonly comprise a plurality of fuel pumps, and it is expedient to have a single delivery control means to control all of them. Therefore, in a preferred embodiment said plurality of delivery outlets can be arranged in groups, each of which is controlled by a delivery control means comprising a unique site identifier. Further, said mobile communications device can be adapted to allow for a unique site identifier to be inputted and included in a site request signal, the remote command means can be adapted to send an availability request signal to that delivery control means when in receipt of said site request signal from the mobile communications device, and that delivery control means can be adapted to send an availability signal to said remote command means comprising delivery outlet availability data. Said remote command means can be adapted to forward said delivery outlet availability data to said mobile communications device.

With this arrangement a user can arrive at a vehicle fuel station, then open communications with the remote command means to find out which fuel pumps are available for use. The remote command means can then obtain this information from the delivery control means and pass it to the user. At this point the user can identify a fuel pump of choice and input its unique identifier, which can be taken directly therefrom, or can be contained in the delivery outlet availability data, and then send the reservation request signal as described above to reserve that fuel pump. The sending of a site request signal in this manner may not be necessary, for example if all the fuel pumps are available when a user arrives. He can then simply send the reservation request signal to reserve one of the fuel pumps. Alternatively, the requirement to send a site request signal may be preferred because it is expedient to include the unique identifier of the fuel pump in the delivery outlet availability data, which avoids the need for the user to input it. In particular, a user can arrive at a vehicle fuel station and park next to a free fuel pump, and then use the mobile communications device to send the site request signal. He can then be presented with a menu of numbered fuel pumps, from which he can select the one he is parked alongside to reserve it.

In one version of the invention said remote command means can comprise a database of delivery outlet groups comprising delivery outlet group location data. The mobile communications device can comprise location determination means and can be adapted to allow for determined device location data to be included in a search request signal. Said remote command means can be adapted to send delivery outlet group location data relevant to said determined device location data to said mobile communications device upon receipt of said search request signal.

Thus, a user can open communications with the remote command means from any location, and find out where the nearest vehicle fuel station is located which is a part of the system. Most modern mobile telephones comprise location determination means of a known type, for example a cellular network triangulation mechanism or a global positioning satellite system. The location data determined by such systems can be incorporated into a search request signal using known techniques. Again, the sending of a search request signal in this manner may not be necessary, for example if the user is already at a participating vehicle fuel station, or knows where the nearest one is located. He can then open communications with the remote command means by sending the site request signal as described above. However, if a search request signal is sent and delivery outlet group location data returned, this can include the site identifier for any site or sites identified, and this can negate the requirement for the user to input it. Instead the sending of the site request signal can simply involve selecting a particular site from a menu. This also allows the availability of fuel pumps to be determined prior to arrival at a vehicle fuel station. This would be useful if none were available, for example if the vehicle fuel station were very busy, or perhaps out of fuel, in which case a different site can be chosen from the menu instead. It will be appreciated that this arrangement allows for the availability of product at a plurality of local sites to be determined remotely, which allows a user to travel to one with product available, preventing unnecessary trips to sites where no product is available, or where it is very busy.

In one construction the delivery control means can comprise a display, and can display a reserved message on said display when in receipt of said reservation signal. This allows a user to know that the fuel pump he is alongside has been reserved for him, which provides a level of assurance that the ensuring financial transaction is legitimate.

Although the present invention finds particular application with the selling of vehicle fuel, it will be appreciated that it can also be used to facilitate the delivery of any product. For example, it can be used to facilitate the purchase of commercial products from vending machines, for example foods and drinks, or any other small products commonly sold from such machines, such as publications, maps, CDs, DVDs, etc. However, preferably said product can be liquid fuel, and said delivery outlet can be a liquid fuel pump.

Further, although it is possible for the invention to be performed using other kinds of devices, in a preferred embodiment the mobile communications device can be a mobile telephone which can be connectable to the remote command means via a mobile telecommunications network. Further, the delivery control means can be connected to the remote command means via the internet.

The invention can be performed in various ways, but one example will now be described by way of example and with reference to the accompanying drawings, in which.

Figure 1:
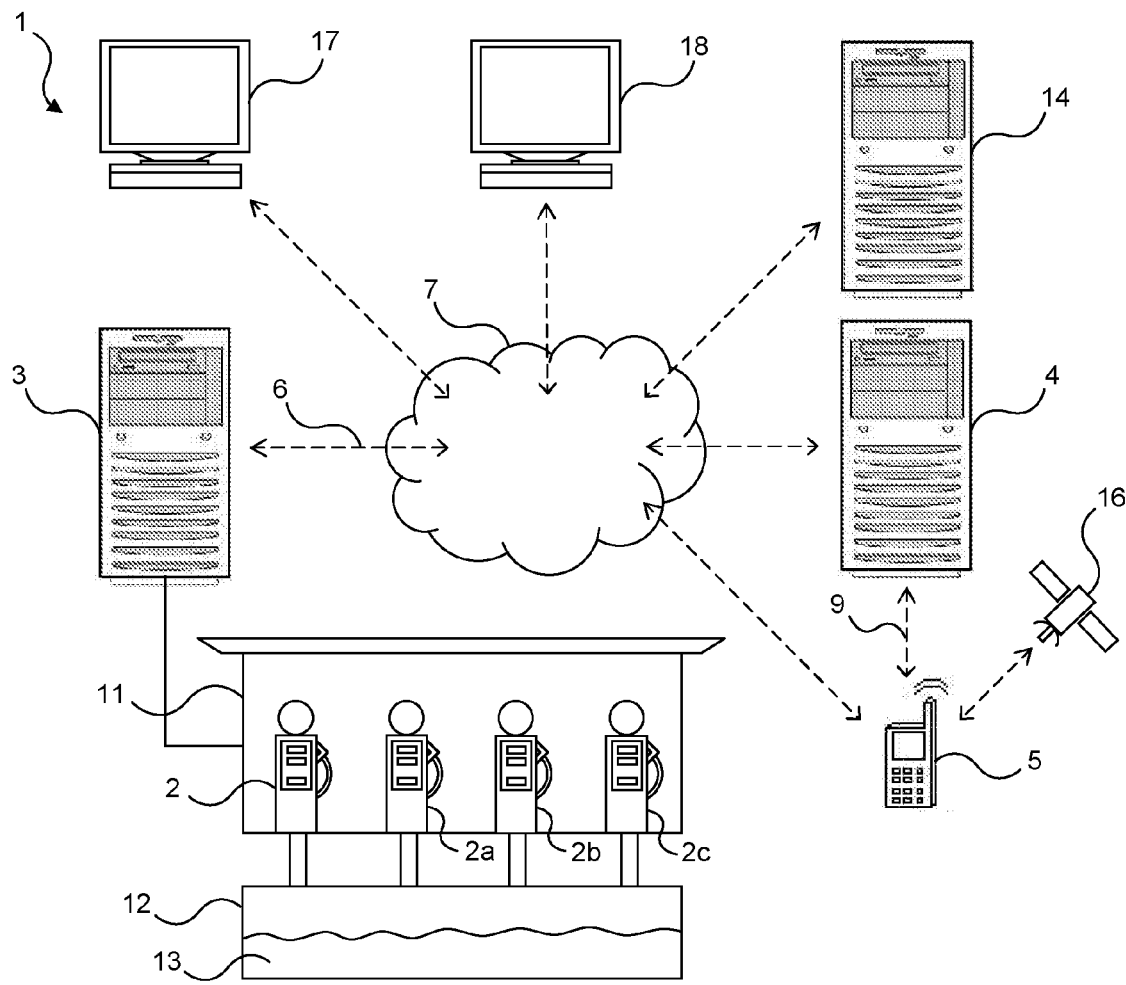
FIG. 1 is a diagrammatic view of apparatus for the delivery of a product according to the present invention.
Figure 7:
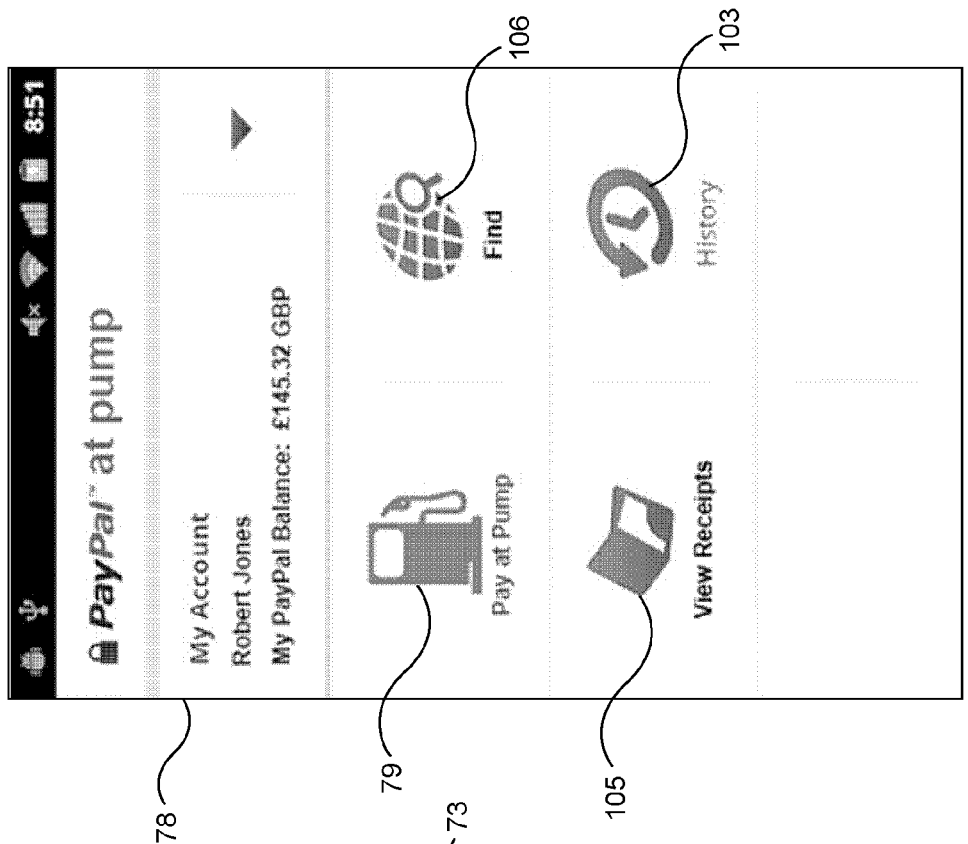
Figure 6:
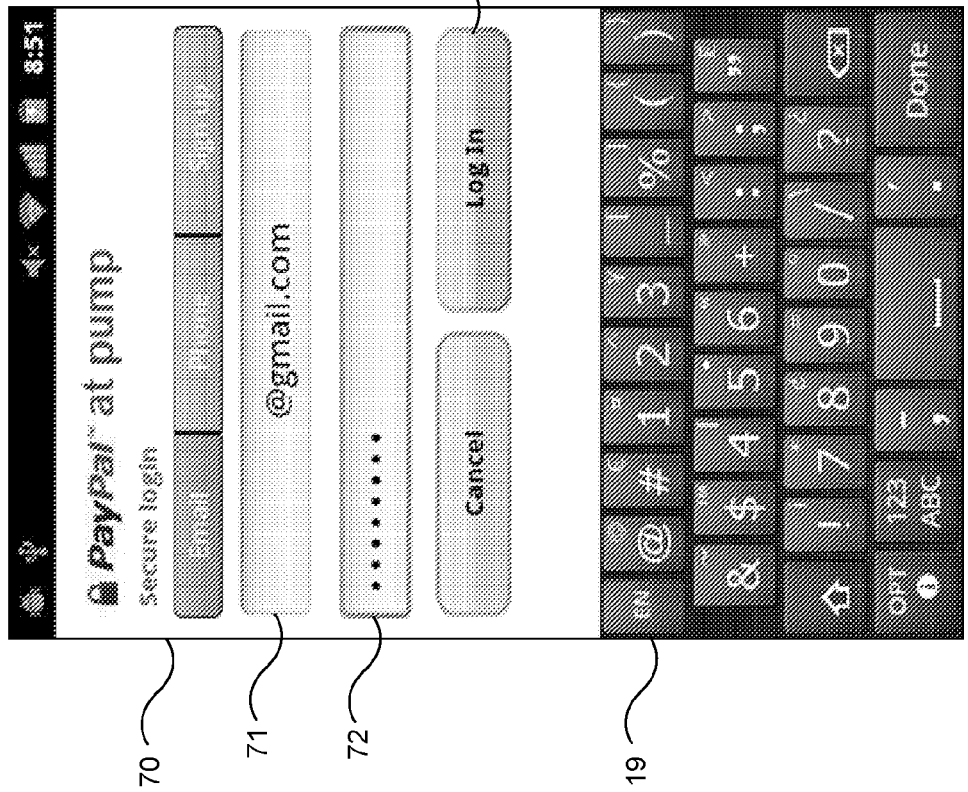
Figure 9:
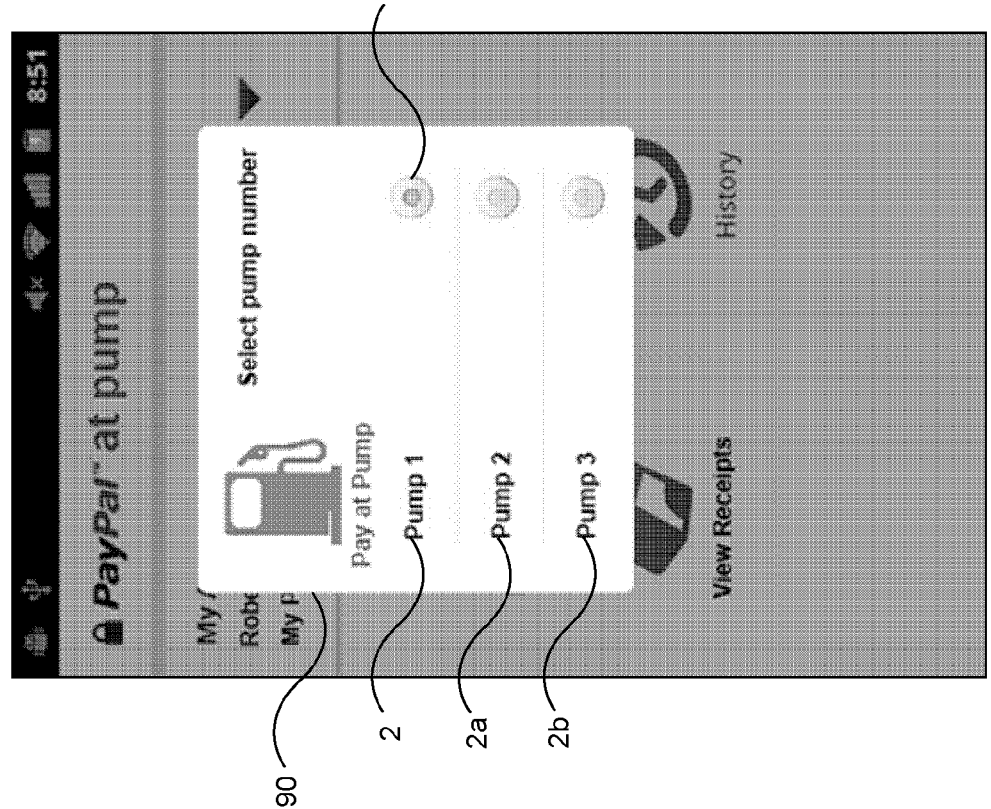
Figure 8:
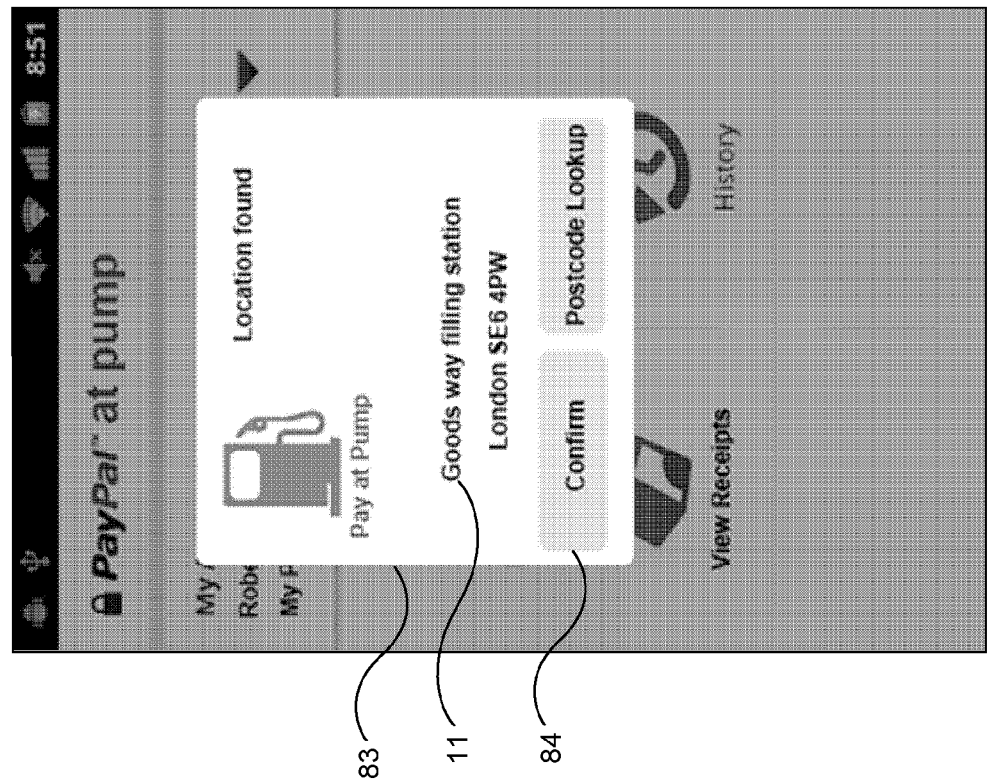
Figure 10:
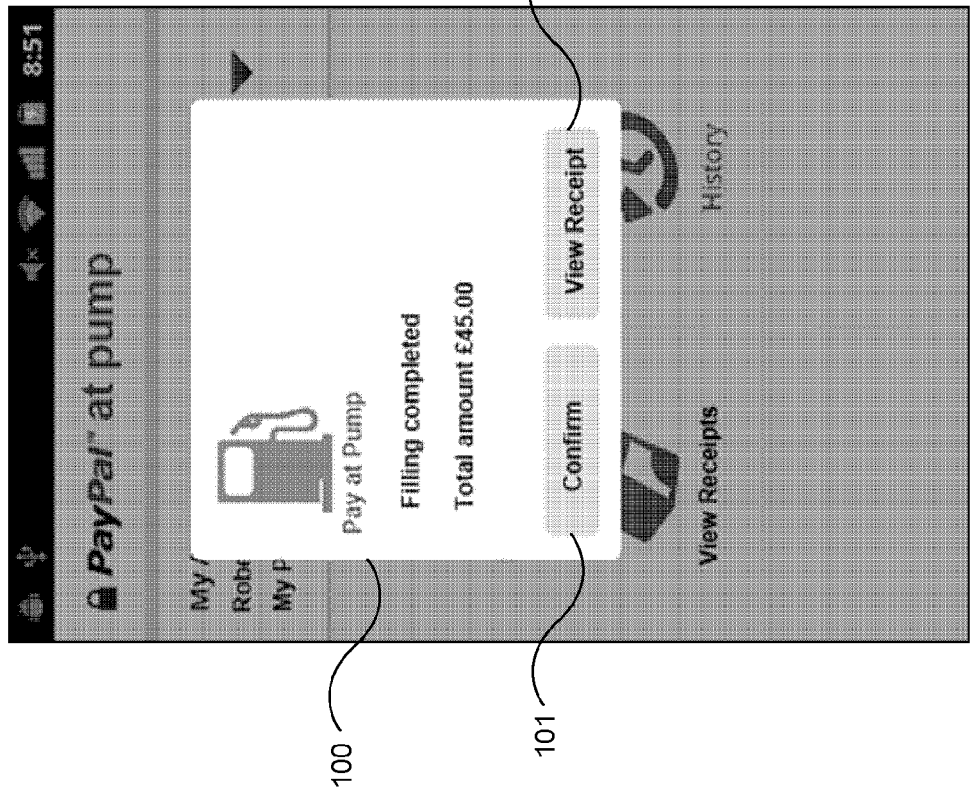
Figure 11:
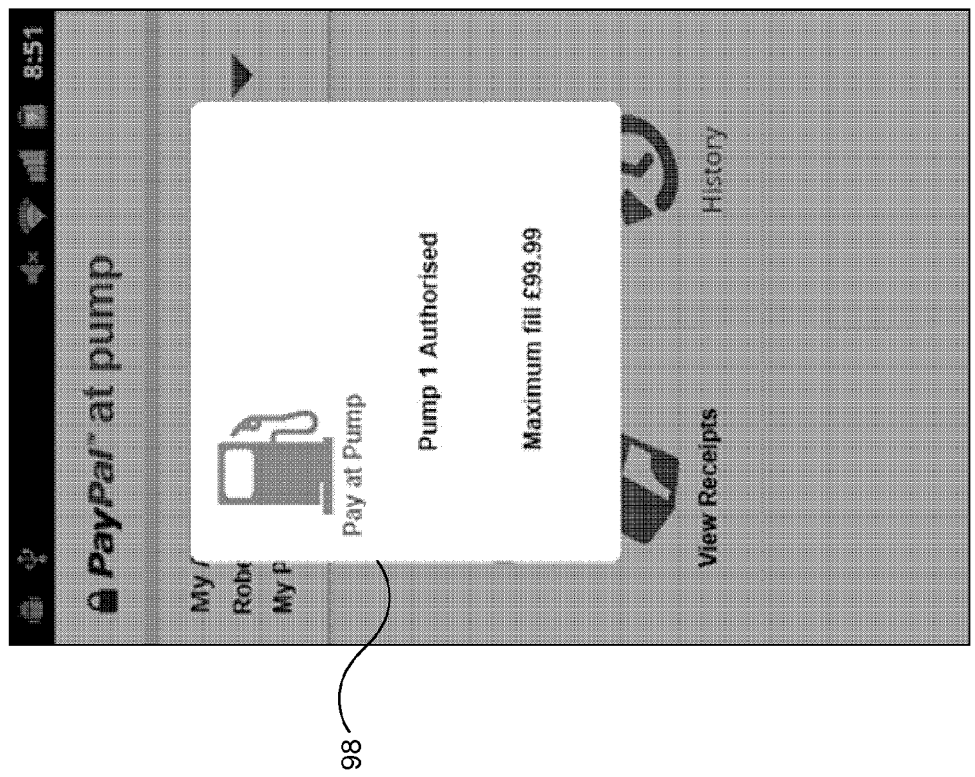
Figure 12:
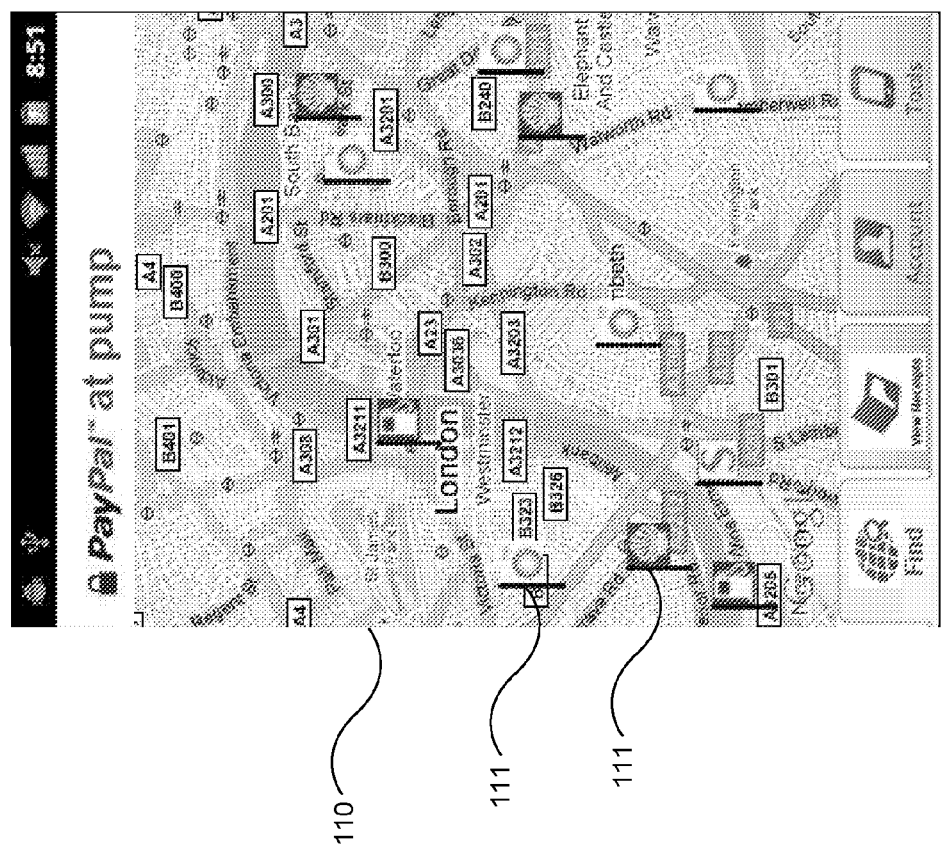

FIG. 6 a screen shot of the mobile telephone application program forming a part of the apparatus as shown in FIG. 1;

FIG. 7 a screen shot of the mobile telephone application program forming a part of the apparatus as shown in FIG. 1;

FIG. 8 a screen shot of the mobile telephone application program forming a part of the apparatus as shown in FIG. 1;

FIG. 9 a screen shot of the mobile telephone application program forming a part of the apparatus as shown in FIG. 1;

FIG. 10 a screen shot of the mobile telephone application program forming a part of the apparatus as shown in FIG. 1;

FIG. 11 a screen shot of the mobile telephone application program forming a part of the apparatus as shown in FIG. 1; and, FIG. 12 a screen shot of the mobile telephone application program forming a part of the apparatus as shown in FIG. 1.

As shown in FIG. 1 apparatus for the delivery of a product 1 comprises a delivery outlet, in the form of fuel pump 2, delivery control means, in the form of vehicle fuel station delivery control computer 3, remote command means, in the form of service provider remote command computer 4, and a mobile communications device, in the form of user mobile telephone 5. The delivery control means (3) is connected to the remote command means (4) via a communications network, in the form of landline connection 6 over the internet 7, and as explained further below is adapted to activate the delivery outlet (2) when in receipt of an activation signal 8 from said remote command means (4). The mobile communications device (5) is connectable to the remote command means (4) via a communications network, in the form of a connection 9 established over mobile telecommunications network. As is also explained further below, the remote command means (4) is adapted to send said activation signal 8 to said delivery control means (3) when in receipt of an activation request signal 10 from said mobile communications device (5).

(The following is a simplified explanation of the apparatus of the invention which is intended to illustrate its various features, and to demonstrate how they interact with one another to achieve technical effects. The invention comprises a number of computers which interact with one another and which process data in various ways. However, where the operating systems, computer programs and sub-programs are described, this is done in a simplified way for ease of explanation. It will be appreciated that provided the technical effects described are achieved it is not important exactly how this is done. Any known computer programming method can be used to put the features of the invention into effect, and in practice it will be down to the individual programmer and the software and/or hardware which is used. As such, further explanation of how to precisely program the computers of the invention to achieve the technical effects of the invention is not given here.)

The apparatus 1 comprises a number of computers at different sites which are connectable to one another over the internet 7, in the known way. Any known communications protocol can be used, along with any known security mechanisms. The delivery control computer 3 is located at a vehicle fuel station 11, which in the example shown comprises four fuel pumps 2-2c. These are connected to a tank 12 of fuel 13, and can pump it into vehicle fuel tanks in the known way. The computer 3 is conveniently situated in a secure interior location, for example in a back office, and is connected to the fuel pumps 2-2c with suitable communications cables, for example Ethernet cables or the like. The remote command computer 4 is located at a service provider's facility, which can be anywhere a service provider is based. The apparatus 1 further comprises a remote transaction computer 14, which can be at an online financial transaction provider's facility, which again can be anywhere such a provider is based. In the embodiment described this provider is Paypal®. The user's mobile telephone 5 is carried by the user, and as explained further below, can be used from anywhere to locate a vehicle fuel station such as station 11, and also while actually on the site of the station 11. It comprises a GPS location determination mechanism 15, which works with the GPS system 16. Other computers can also access the apparatus 1 in order to obtain information by browsing the internet 7, such as a vehicle fuel provider's computer 17 and user's computer 18.

Figure 2:
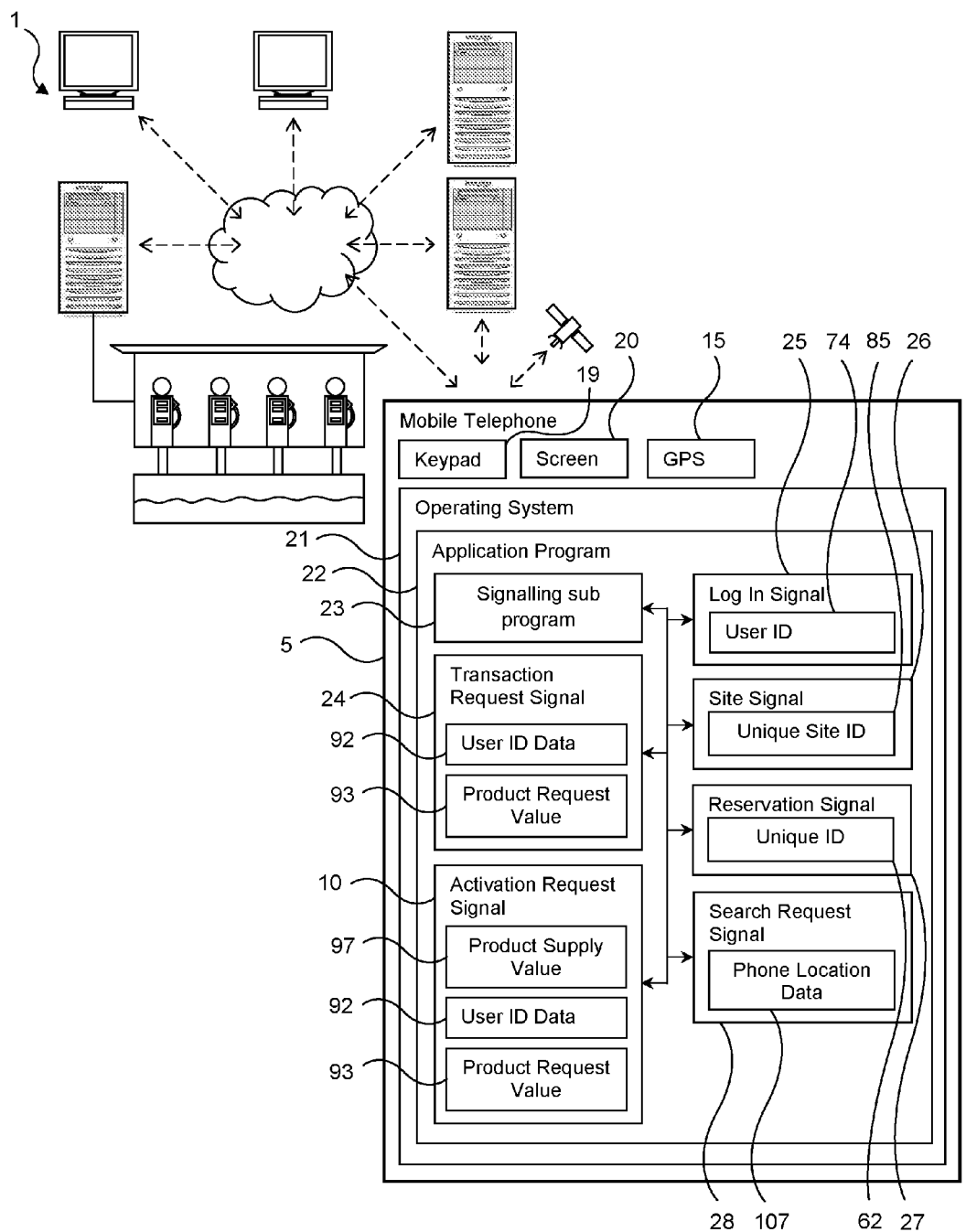
FIG. 2 is a diagrammatic view of the apparatus for the delivery of a product as shown in FIG. 1, showing greater detail of the mobile telephone part.

Referring to FIG. 2, the mobile telephone 5 is of any known design, and comprises a keypad 19 for manually entering data, and a screen 20 for displaying data. (It will be appreciated that with most modern smart phones, the keypad is integrated into a touch screen.) It also comprises an operating system 21, which again can be any known design, on which is supported application program 22. The application program 22, or "app", is bespoke to the invention and can be downloaded onto the mobile telephone 5 from the remote command computer 4 in the known way. The application program 22 comprises various sub-programs which allow it to operate on the operating system 21, and to receive and to display data via the keypad 19 and the screen 20. These are all known and are therefore not further described here. Only the functions of the application program 22 which are relevant to the invention are shown. In particular, these comprise a signalling sub-program 23 which is adapted to send and receive various data signals form the other parts of the apparatus 1. These include a transaction request signal 24, the activation request signal 10, a log in signal 25, a site signal 26, a reservation signal 27 and a search request signal 28, all of which are explained further below.

Figure 3:
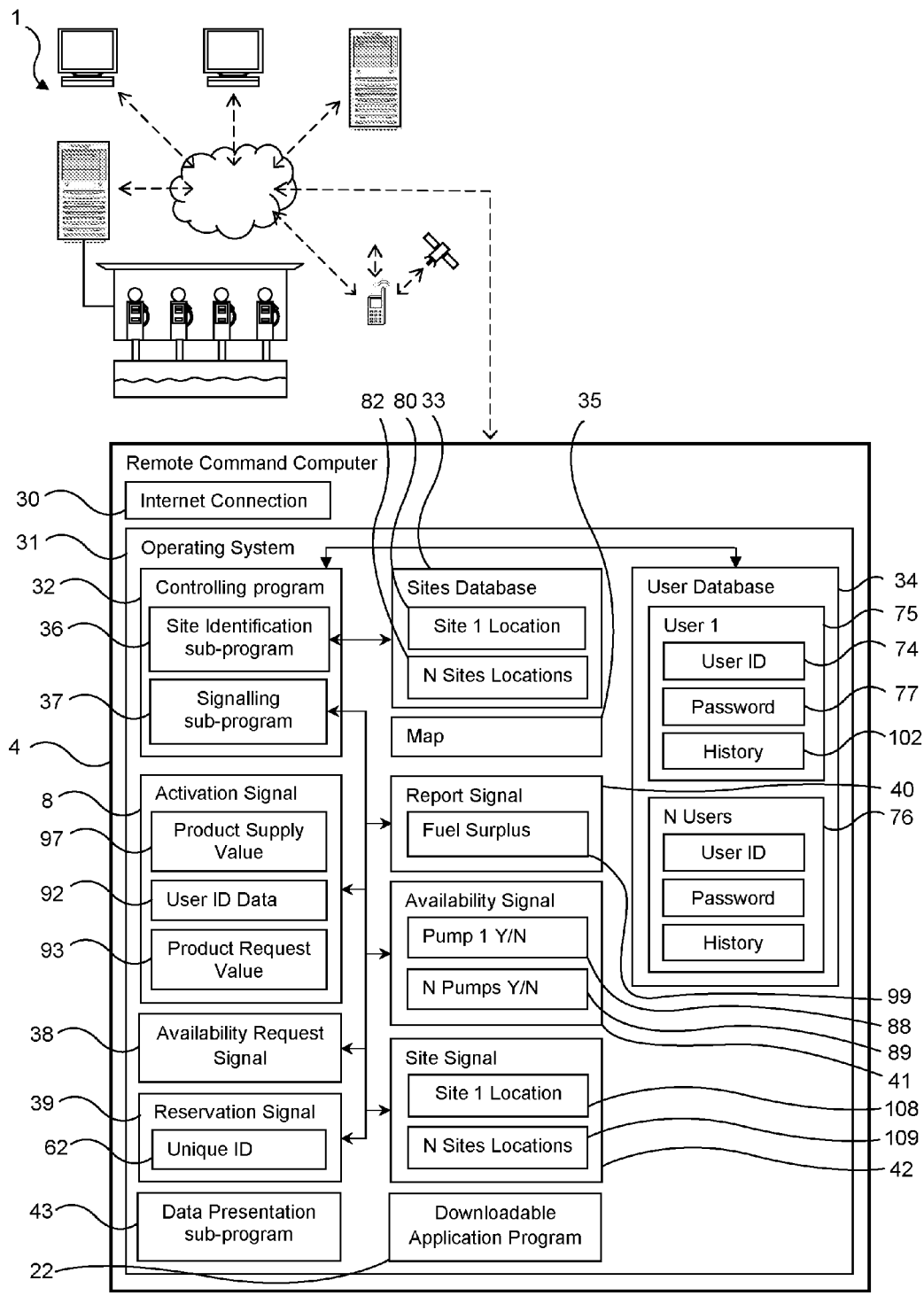
FIG. 3 is a diagrammatic view of the apparatus for the delivery of a product as shown in FIG. 1, showing greater detail of the remote command computer part.

Referring to FIG. 3, the remote command computer 4 is of any known design, and comprises an internet connection 30 and an operating system 31, on which is supported a controlling program 32, a sites database 33, a user database 34 and a map 35. The controlling program 32 is bespoke to the invention and comprises various sub-programs which allow it to operate on the operating system 31, and to receive and to display data. These are all known and are therefore not further described here. Only the functions of the controlling program 32 which are relevant to the invention are shown. In particular, these comprise a site identification sub-program 36, and a signalling sub-program 37 which is adapted to send and receive various data signals form the other parts of the apparatus 1. These include the activation signal 8, an availability request signal 38, a reservation signal 39, a report signal 40, an availability signal 41 and a site signal 42. The downloadable application program 22 and a data presentation sub-program 43 are also supported on the operation system 31.

Figure 4:
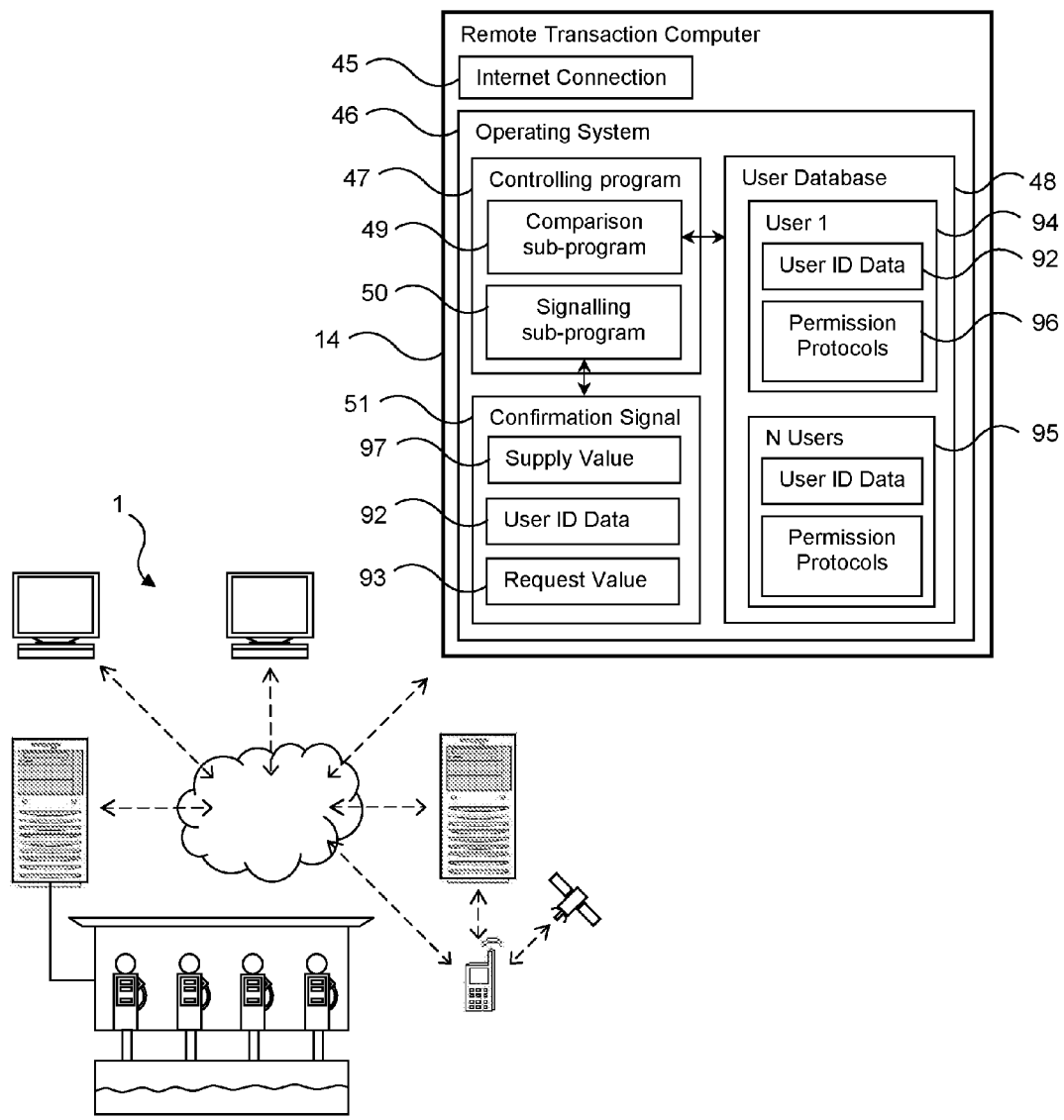
FIG. 4 is a diagrammatic view of the apparatus for the delivery of a product as shown in FIG. 1, showing greater detail of the remote transaction computer part.

Referring to FIG. 4, the remote transaction computer 14 is of any known design, and comprises an internet connection 45 and an operating system 46, on which is supported a controlling program 47 and a user database 48. FIG. 4 obviously represents a gross simplification of the Paypal server, but it is displayed this way so the functions relevant to the invention are shown. In particular, these comprise a comparison sub-program 49, and a signalling sub-program 50 which is adapted to send and receive various data signals form the other parts of the apparatus 1, including a confirmation signal 51.

Figure 5:
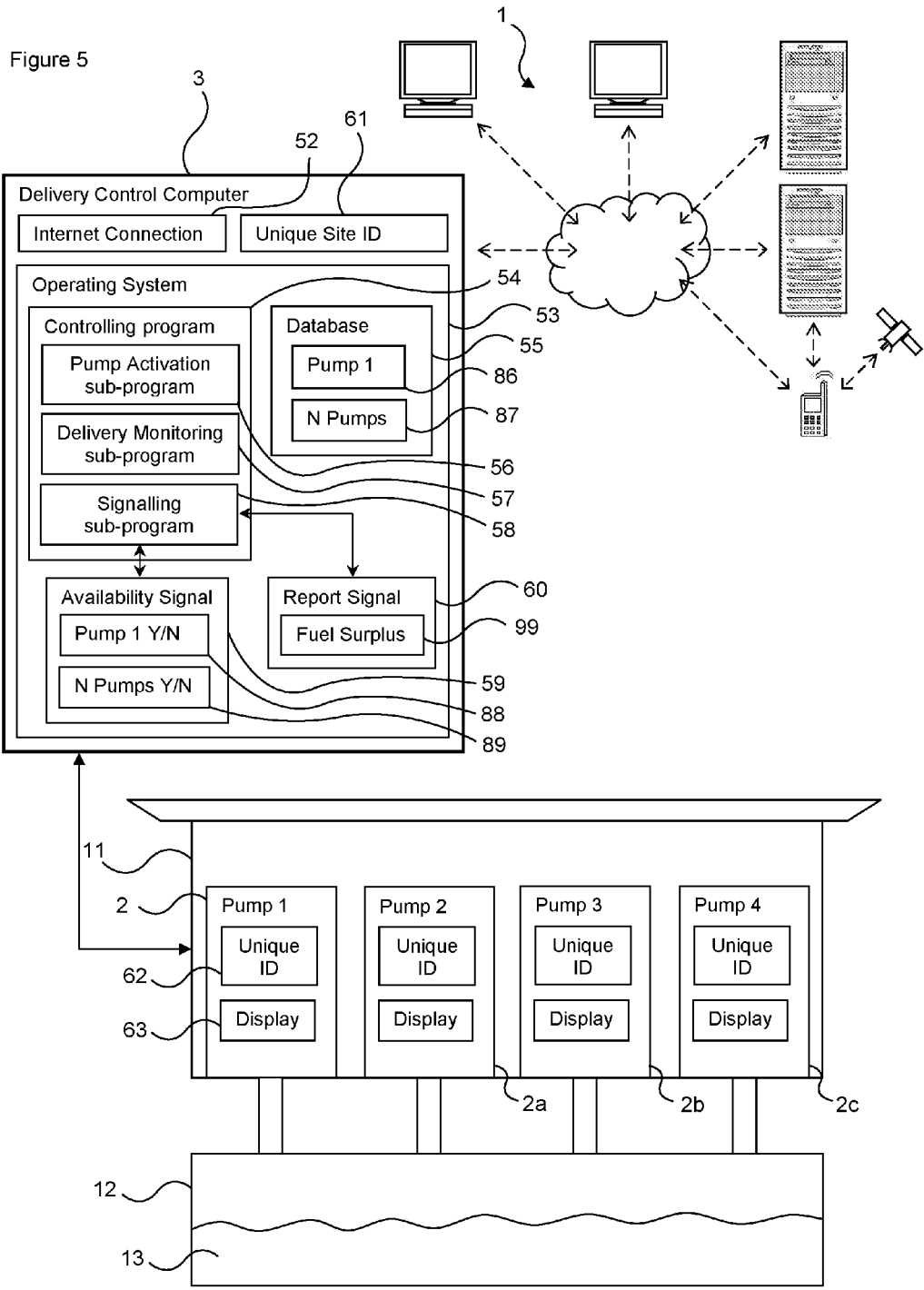
FIG. 5 is a diagrammatic view of the apparatus for the delivery of a product as shown in FIG. 1, showing greater detail of the delivery control computer part.

Referring to FIG. 5, the delivery control computer 3 is of any known design, and comprises an internet connection 52 and an operating system 53, on which is supported a controlling program 54 and a database 55. The controlling program 54 is bespoke to the invention and comprises various sub-programs which allow it to operate on the operating system 53, and to receive and to display data. These are all known and are therefore not further described here. Only the functions of the controlling program 54 which are relevant to the invention are shown. In particular, these comprise a pump activation sub-program 56, a delivery monitoring sub-program 57 and a signalling sub-program 58 which is adapted to send and receive various data signals form the other parts of the apparatus 1. These include an availability signal 59 and a report signal 60. The delivery control computer 3 also comprises a unique site ID 61. FIG. 5 also shows the vehicle fuel station 11 in greater detail, including the four fuel pumps 2-2c. Each of these comprises a unique ID 62 and a display 63.

The apparatus 1 of the invention is used as follows. Firstly, the delivery control computer 3 is switched on, and the controlling program 54 connects it to the internet 7 via the internet connection 52. It communicates with the remote command computer 4, which logs the fact that the site 11 in question is online in the sites database 33. Before using the apparatus 1 the user must download the application program 22 to their mobile telephone 5. This can be obtained from the remote command computer 4 in the known way.

A user arrives at the vehicle fuel station 11 and parks their vehicle alongside an available one of the four fuel pumps 2-2c in the known way. He then operates his mobile telephone 5 to initiate the application program 22. This can be done in the known way by manually selecting a short-cut displayed on the screen 20 of the mobile telephone 5. The user is then presented with the log-in display 70 illustrated in FIG. 6 by the application program 22. (As explained above, sub-programs which allow for such a graphical display and data input interface to be presented on the screen 20 of the mobile telephone 5 are well known, so are not further explained here.) The user uses the keypad 19, which forms a component of the display 70, to enter their user name and password into the boxes 71 and 72 provided, and then selects the log in button 73. The application program 22 then opens communications with the remote command computer 4 via mobile telephone network connection 9, and the signalling sub-program 23 sends the log in signal 25 to the remote command computer 4. The log in signal 25 contains user ID 74, being the user name and password previously entered.

The log in signal 25 is received by the remote command computer 4, and a sub-program thereof (not shown) compares the user ID 74 with user data stored in the user database 34. This database 34 is populated with an entry 75 for user 1, which is the user in the present example, and a plurality of further entries 76 for N further users. If the user ID 74 and password 77 match one of the entries 75-76 in the database 34 then that user is logged in, and a suitable return signal (not shown) is sent from the remote command computer 4 to the mobile telephone 5. This occurs in this case because the user ID 74 of the log in signal 25 matches that of the entry 75 for user 1 in the database 34. This kind of user log in process is a well known one.

Once the return signal is received by the mobile telephone 5, the application program 22 presents a user home page display 78, as illustrated in FIG. 7. To proceed with the purchase of vehicle fuel the user selects the pay at pump option 79.

At this point the user must identify the fuel pump 2-2c alongside which he is parked. In the present example this is done by using the GPS co-ordinates of the mobile telephone 5 to identify the user's location, and then prompting the user to confirm. Therefore, when the pay at pump option 79 is selected by the user the application program 22 sends the site signal 26 to the remote command computer 4. This site signal 26 is not simply one packet of data sent from the mobile telephone 5 to the remote command computer 4, rather it involves the transmission of packets of data both ways over the mobile telecommunications network 9. In particular the signalling sub-program 23 initially sends the GPS co-ordinates of the mobile telephone 5 to the remote command computer 4, which are obtained from the GPS 15. These are compared by the site identification sub-program 36 with data stored in the sites database 33. This database 33 is populated with an entry 80 for site 1, which is the site 11 in the present example, and a plurality of further entries 82 for N further sites. Each entry comprises GPS co-ordinates for the site in question. If the GPS co-ordinates sent from the mobile telephone 5 correspond with those in one of the entries 80-82, then the site the user is located at is identified, and location data is sent back to the mobile telephone 5.

The application program 22 presents an option window 83 as illustrated in FIG. 8, which identifies the site 11 and requests confirmation from the user that they are located there. To do so the user selects the confirm option 84, and the signalling sub-program 23 sends a confirmation response to the remote command computer 4. In FIG. 2 this is illustrated as the unique site ID 85, which in this case comprises the GPS co-ordinates of the site 11.

At this point it is necessary to ascertain the availability of the fuel pumps 2-2c, so the signalling sub-program 37 of the remote command computer 4 sends the availability request signal 38 to the delivery control computer 3 over the internet 7. The controlling program 54 determines the Y/N availability of the pumps 2-2c by reference to their use status, and sends the availability signal 59 back to the remote command computer 4. It does this by reference to the database 55, which is populated with an entry 86 for the first pump 2, and a plurality of further entries 87 for N further pumps, which in this case are pumps 2a-2c. Therefore, the signal 59 comprises an entry 88 for pump 2, which is the pump the user is parked alongside in the present example, and entries 89 for the N further pumps 2a-2c. In this case pumps 1 to 3 are available while pump 4 is not. The remote command computer 4 forwards this information to the mobile telephone 5 in the form of the availability signal 41, comprising the same entries 88-89 as were received.

The application program 22 presents another option window 90 as illustrated in FIG. 9, which identifies the available fuel pumps 2-2b, and requests confirmation from the user of the pump they are located alongside. To do so the user selects the appropriate button 91.

When this is done the signalling sub-program 23 of the mobile telephone 5 sends the reservation signal 27 to the remote command computer 4. This comprises a unique ID 62, which in this case is that associated with the pump 2 which has been selected by the user. The signalling sub-program 37 of the remote command computer 4 then sends reservation signal 39 to the delivery control computer 3, which comprises the same unique ID 62. The controlling program 54 of the delivery control computer 3 then reserves the chosen pump for the user, and displays a reserved message on the display 63 of the pump 2. At the same time the signalling sub-program 58 sends a confirmation signal (not shown) that the pump 2 has been reserved to the remote command computer 4, which forwards it to the application program 22.

Now the correct pump has been identified and reserved for the user, they must purchase the desired quantity of vehicle fuel 13. Therefore, the application program 22 presents another option window (not shown) which allows the user to enter the financial amount they wish to spend, using the keypad 19. The application program 22 then connects to the Paypal server 14 over the internet 7, and sends the transaction request signal 24. Again, the transaction request signal 24 is not simply one packet of data sent from the mobile telephone 5 to the Paypal server 14, rather it involves the transmission of various packets of data both ways over the internet 7, so that a financial transaction can be performed by the user in the known way. Therefore, the transaction request signal 24 comprises the usual packets of data a user would have to send to a remote transaction means to facilitate the transaction, including data comprising a user name, password, PIN, or any other device for confirming identity. This is illustrated in FIG. 2 as the user ID data 92. It also comprises the inputted financial value of vehicle fuel the user wants to purchase, which is illustrated in FIG. 2 as the product request value 93. This also comprises information about the vendor and the site, which have been gathered by the application program 22 in the previously described site identification step.

When the user ID data 92 is received by Paypal the comparison sub-program 49 compares it with data stored in the user database 48. This database 48 is populated with an entry 94 for user 1, which is the user in the present example, and a plurality of further entries 95 for N further users. Each entry 94-95 comprises user ID data 92 and user permission protocols 96. If the user ID data 92 in the transaction request signal 24 matches one of the entries 94-95 in the database 48 then the user is logged in by Paypal, and a suitable return signal is sent from the Paypal server 14 to the mobile telephone 5. Again, this user log in process is a well known one.

The comparison sub-program 49 then compares the product request value 93 with the permission protocols 96, which as explained above may be a particular credit or debit limit, or a time delay necessary between transactions to prevent fraud. In order to have a Paypal account it is necessary to apply for one, which includes the provision of relevant and up to date banking details, which are used by Paypal to perform transactions on the user's behalf. Therefore, the permissions protocols 96 will also comprise such relevant and up to date details, which must be satisfied. If they are not satisfied then Paypal may request the provision of new information, in the known way, before proceeding. (It is also known for remote transaction facilities like Paypal to require the completion of a third party identification and verification process, such as are now often used by banks and credit facilities. These involve a secure connection being made to the bank's internet server (not shown), and the requirement to enter further ID data, such as user numbers or PINs. Only if done so correctly is a return signal sent by the bank's internet server, which allows the financial transaction to then be completed. If such a process is employed, then this also forms part of the comparison sub-program's 49 functioning.)

If the product request value 93 satisfies the permission protocols 96 then the transaction is completed by Paypal, which then debits the user's bank account in the known way. It also credits the vehicle fuel provider's bank account in the known way, by reference to the relevant vendor and/or site data sent in the transaction request signal. The signalling sub-program 50 then sends the confirmation signal 51 to the mobile telephone 5. This comprises a supply value 97, being the agreed financial value of vehicle fuel which has been purchased, as well as the user ID data 92 and the product request value 93.

Performing a financial transaction in this way on Paypal is well known, so the details are not further described here. All that is relevant is that the purchase of a desired quantity of vehicle fuel from the vendor is facilitated, and once done so the confirmation signal 51 is sent to the mobile telephone 5.

Now the reserved pump 2 must be activated to allow for the delivery of the vehicle fuel 13 which has been purchased. Once the confirmation signal 51 is received by the application program 22, the signalling sub-program 23 sends the activation request signal 10 to the remote command computer 4. As illustrated in FIG. 2 the activation request signal 10 comprises the product supply value 97, the user ID data 92 and the product request value 93. This signal 10 is received by the remote command computer 4, and its signalling sub-program 37 sends the activation signal 8 to the delivery control computer 3. Again, this comprises the product supply value 97, the user ID data 92 and the product request value 93. The pump activation sub-program 56 of the delivery control computer 3 then activates the reserved pump 2, and it can be manually operated by the user to dispense a quantity of the vehicle fuel 13 up to the product supply value 97. At the same time the signalling sub-program 58 sends a confirmation signal (not shown) that the pump 2 has been activated for use to the remote command computer 4, which forwards it to the application program 22. It then presents a message window 98 as illustrated in FIG. 10, which confirms that the chosen pump has been activated and that it can be used to dispense vehicle fuel up to the product supply value, which in this instance is £99.99.

When the user operates the fuel pump 2, the quantity of vehicle fuel 13 which is dispensed is monitored by the delivery monitoring sub-program 57 of the delivery control computer 3. It gathers this information from the fuel pump 2, which as in known constructions comprises a liquid flow meter (not shown) which records the quantity of vehicle fuel passing therethough. If the full product supply value is delivered, the pump activation sub-program 56 deactivates the pump 2, and the signalling sub-program 58 sends a confirmation signal (not shown) to the remote command computer 4, which then forwards it to the mobile telephone 5. The user then leaves the vehicle fuel station 11.

However, for illustrative purposes in the present example the user only operates the pump 2 to deliver £45.00 worth of vehicle fuel. This is detected by the delivery monitoring sub-program 57, which then determines the difference between the product supply value 97 and the quantity of vehicle fuel delivered, to arrive at a fuel surplus 99. The signalling sub-program 58 sends the report signal 60 to the remote command computer 4, which comprises said fuel surplus 99. Upon receipt of this, the signalling sub-program 37 of the remote command computer 4 sends its own report signal 40 comprising the fuel surplus 99 to the mobile telephone 5. The application program 22 presents another option window 100 as illustrated in FIG. 11, which notifies the user that the delivery of vehicle fuel 13 has been completed only for a £45.00. The user is prompted to confirm that this is correct, which they can do by selecting the option 101. If so, the signalling sub-program 23 sends a confirmation signal (not shown) to the remote command computer 4. When this is received the signalling sub-program 37 of the remote command computer 4 sends the report signal 40 to Paypal 14 over the internet 7. The remote command computer 4 is recognised by Paypal 14 as a vendor user thereof, and it facilitates a refund to the user of the fuel surplus 99 amount. The manner in which such a refund can be facilitated by a vendor user of Paypal is well known, and is not further described here. In the event that the user does not select the option 101, the application program 22 sends a default confirmation signal (not shown) after a short time delay.

(In the above described example a transaction is performed on Paypal for the purchase of £99.99 of vehicle fuel 13, and then a refund is arranged because a lesser amount is delivered. It will be appreciated that it is also possible to arrange the apparatus 1 of the invention slightly differently, with a payment authorisation being performed initially rather than a transaction. To the user this is ostensibly the same process, but instead of actually performing a financial transaction a user's financial account is not debited when they first make the transaction request, rather an authorisation is provided for vehicle fuel 13 up to a certain value to be purchased. The delivery is then monitored as explained above, and the actual value taken is then debited from the user's financial account, by reference to the data in the report signal 40. With such an arrangement the product request value 93 can be automatically set at a nominally large enough sum to cover most vehicle fuel purchases, for example £99.99, and the user does not have to input a desired quantity of vehicle fuel 13 to purchase as described above. The user's financial account is then only debited for this sum minus the fuel surplus value 99, after the remote command computer 4 sends the report signal 40 to Paypal 14.)

It will be appreciated from the above that data relating to the described purchase of vehicle fuel 13 is distributed across the mobile telephone 5, the remote command computer 4, the delivery control computer 3 and Paypal 14. In particular, the user ID data 92, the product request value 93, the product supply value 97 and the fuel surplus 99 are provided to each. Further, the location 11 of the purchase (and even the pump 2) are also known, and it will be appreciated that the time and date of the purchase can readily be obtained. As such, data relating to the purchase of vehicle fuel 13 in this way can be stored for further reference, and for the production of documentation, such as a receipt. In particular, the controlling program 32 of the remote command computer 4 stores this information in a history log 102 associated with the user entry 74 in the user database 34. A user can access this history log 102 by activating the application program 22 at any time as explained above, and then selecting the history option 103 of the home page display 78 shown in FIG. 7. The data presentation sub-program 43 of the remote command computer 4 can then provide relevant historical information to the user about their purchase history, such as the number of purchases, the quantity of vehicle fuel 13 purchased each time, as well as the location, date and time of those purchases. The manner in which such information can be presented is well known and not further described here.

In addition, the data presentation sub-program 43 can also be accessed to produce receipts, either immediately after a purchase, or thereafter. Referring to FIG. 11, after the user has finished delivering vehicle fuel 13 they are presented with the option window 100, which includes a view receipt option 104. If the user selects this option the signalling sub-program 23 of the mobile telephone 5 sends a receipt request signal (not shown) to the remote command computer 4, and the data presentation sub-program 43 generates a receipt document by reference to the history log 102, which is sent to the mobile telephone 5 by the signalling sub-program 37. If a user wishes to access any receipt at a later date, they can do so by activating the application program 22 as explained above, and then selecting the view receipts option 105 of the home page display 78 shown in FIG. 7. The data presentation sub-program 43 of the remote command computer 4 can then provide the receipt documents. The manner in which such information can be provided is well known and is therefore not further described here.

In addition to this, the information stored in the database 34 of the remote command computer 4 can be accessed via the internet 7 from elsewhere, and in particular from the user's computer 18 and the vehicle fuel provider's computer 17. Application programs similar to that 22 loaded onto the mobile telephone 5 can be downloaded onto the computers 18 and 17, allowing any user or fuel provider to log onto the remote command computer 4 and request information from the data presentation sub-program 43. In terms of the user, this information can be that described above relating to their purchases. However, the vehicle fuel provider which operates the site 11 can be provided with greater information relating to all the purchases made at the site 11, including the identity of the customers, the quantity of vehicle fuel 13 purchased each time, or in total, as well as the date and time of each purchase. This kind of information could be very useful for business assessment and customer monitoring and marketing purposes. Again, the manner in which such information can be provided is well known and is therefore not further described here.

In the above described embodiment only one site 11 is shown, but it will be readily appreciated that in practice there will be a plurality of such sites, operated by different vendors. Indeed, the sites database 33 of the remote command computer 4 contains entries 82 for N further sites, including their GPS co-ordinates, as well as a map 35 which plots them. This allows for a further beneficial search function to be performed, to allow a user to locate participating sites. This is useful if the user wants to locate their nearest site, but it is also useful if the user is unfamiliar with an area and does not know where any vehicle fuel stations are located.

To use this function the user activates the application program 22 as described above, and logs themselves into the remote command computer 4. They then select the find option 106 from the home page display 78 illustrated in FIG. 7. When this is done the signalling sub-program 23 sends the search request signal 28 to the remote command computer 4. This contains phone location data 107, which are its GPS co-ordinates, provided by the GPS 15. When this is received by the remote command computer 4 the site identification sub-program 36 uses the phone location data 107 to plot the position of the mobile telephone 5 on the map 35. The signalling sub-program 37 then sends the site signal 42 to the mobile telephone 5 comprising a relevant portion of the map 35, being that with the position of the mobile telephone 5 at its centre. As the map 35 contains the locations of all the sites in the sites database 33, this relevant portion thereof illustrates to the user where their nearest participating sites are located. This data is shown in FIG. 2 as the site 1 location 108 and n sites locations 109. The application program 22 presents a map view 110 as shown in FIG. 12, which comprises a road map display showing a plurality of participating sites 111. This display is generated using the known Google® maps software, and as such the user can move the map to view different parts thereof, and zoom in and out to see greater or lesser detail, in the known way.

The user can select any of the participating sites 111 on the screen 20, and if this is done they can go through the site and pump selection process described above, which can allow them to ascertain if a particular site is online, and if pumps are available for use. In particular, selecting a site 111 on the screen 20 is the equivalent of selecting the confirm option 84 shown in FIG. 8. The signalling sub-program 23 sends a communication to the remote command computer 4, which then sends the availability request signal 38 to the delivery control computer 3. The controlling program 54 determines the Y/N availability of the pumps 2-2c by reference to their use status, and sends the availability signal 59 back to the remote command computer 4, which then forwards it to the mobile telephone 5. The application program 22 presents the option window 90 as illustrated in FIG. 9, which identifies the available fuel pumps 2-2b, and requests confirmation from the user of the pump they wish to select. If a user was some distance from the site selecting one of these pumps would be inconvenient for other users, so it is not permitted by the application program 22, which determines that the user is not on site by comparing the GPS co-ordinates of the mobile phone 5 with those of the site 111 which has been selected. However, the option window 90 serves as communication to the user that the site is online and that pumps are free, and that it is therefore worthwhile travelling to the site. If the site is not online, or if no pumps are available, the user can go back to the map view 110 and select an alternative site 111.

The above described embodiment can be altered without departing from the scope of claim 1. For example, in one alternative embodiment (not shown) similar apparatus is provided but instead of a vehicle fuel station there is provided a vending machine. The apparatus operates in the same way, but instead of the activation of a fuel pump, the delivery control computer operates the vending machine to dispense the chosen product.

It will be appreciated that several of the technologies described above, such as GPS location determination, internet communication, telecommunications communication and so on have analogous alternatives which can be used instead without affecting the novel functions of the invention. For example, in one alternative embodiment (not shown) the mobile telephone determines its location via network cell triangulation. In another alternative example (not shown) instead of Paypal, an alternative online transaction provider is used, for example that of a bank.

In the above described embodiment the identification of the site, and of the fuel pump, is performed by confirming or selecting options presented by the application program. However, in an alternative embodiment (not shown) this is instead performed by the user manually inputting site and pump ID numbers into the mobile phone, which are displayed at the site and on the pump. In a further alternative embodiment (not shown) this is performed by the user scanning bar or QR codes with the mobile telephone, which are displayed at the site and on the pump.

Therefore, the present invention provides apparatus which allows for fuel to be purchased by means of a mobile phone based financial transaction, so the transaction to take place at the pump without the requirement for an expensive outdoor card reader to be incorporated thereon. It also eliminates the problem of users delivering fuel to their vehicles without paying, and avoids the dangers associated with using payment card readers in fuel stations which might be fake. Further, it also provides a useful way for users and vehicle fuel providers to maintain data on purchases for future reference.

The invention claimed is:

1. An apparatus for the delivery of a fuel product comprising a plurality of fuel delivery outlets, a delivery control device coupled to the fuel delivery outlets, a remote command device and a mobile communications device, in which the delivery control device is remotely coupled to the remote command device via a first communications network, and is adapted to activate one of the fuel delivery outlets when in receipt of an activation signal from said remote command device, in which the mobile communications device is connectable to the remote command device via a second communications network, and in which the remote command device is adapted to send said activation signal to said delivery control device when in receipt of an activation request signal from said mobile communications device;

wherein the delivery control device determines an availability of each of the delivery outlets and sends the availability to the remote command device;

wherein the remote command device sends the availability to the mobile communications device and in response, the mobile communications device displays available fuel delivery outlets and receives a selection from a user of the mobile communications device of one of the available fuel delivery outlets;

wherein the selected available fuel delivery outlet is the fuel delivery outlet that is activated by the delivery control device when it receives the activation request signal.

2. The apparatus for the delivery of the fuel product as claimed in claim 1 further comprising a remote transaction device, in which the mobile communications device is connectable to the remote transaction device via a third communications network, in which the remote transaction device is adapted to send a confirmation signal to said mobile communications device when in receipt of a transaction request signal from said mobile communications device, and in which the mobile communications device is adapted to only send said activation request signal to said remote command device when in receipt of said confirmation signal.

3. The apparatus for the delivery of the fuel product as claimed in claim 2 in which said remote transaction device comprises a database of user data, in which said transaction request signal comprises user identification data, in which said transaction device is adapted to compare said user identification data with user data in said database, and to only send said confirmation signal to said mobile communications device if said user identification data matches user data in said user database.

4. The apparatus for the delivery of the fuel product as claimed in claim 3 in which the database of user data further comprises user permission protocols, in which said transaction request signal comprises user request data, in which said transaction device is adapted to compare said user request data with said user permission protocols, and to only send said confirmation signal to said mobile communications device if said user request data comply with a corresponding user permission protocol.

5. The apparatus for the delivery of the fuel product as claimed in claim 4 in which the user request data comprises a product request value, in which the confirmation signal, the activation request signal and the activation signal all comprise a product supply value, and in which the delivery control device is adapted to activate the fuel delivery outlet only according to said product supply value.

6. The apparatus for the delivery of the fuel product as claimed in claim 5 in which said confirmation signal, said activation request signal and said activation signal all comprise said user identification data and said user request data.

7. The apparatus for the delivery of the fuel product as claimed in claim 6 in which the fuel delivery outlet is manually operable to deliver fuel product, in which the delivery control device comprises a product delivery monitoring device, in which if the product delivery monitoring device detects that the delivery outlet has been manually operated to deliver less product than said product supply value the delivery control device is adapted to send a report signal comprising a product surplus value to said remote command device, in which said remote command device is connectable to said remote transaction device via a fourth communications network, and in which said remote command device is adapted to forward said product surplus value to said remote transaction device.

8. The apparatus for the delivery of the fuel product as claimed in claim 7 comprising a plurality of delivery outlets, each comprising a unique identifier, in which said apparatus comprises a database of said plurality of delivery outlets, in which said mobile communications device is adapted to allow for a unique identifier to be inputted and included in a reservation request signal, and in which the remote command device is adapted to send a reservation signal to the delivery outlet comprising that unique identifier when in receipt of said reservation request signal from said mobile communications device.

9. The apparatus for the delivery of the fuel product as claimed in claim 8 in which said plurality of delivery outlets are arranged in groups, each of which is controlled by a delivery control device comprising a unique site identifier, in which said mobile communications device is adapted to allow for a unique site identifier to be inputted and included in a site request signal, in which the remote command device is adapted to send an availability request signal to that delivery control device when in receipt of said site request signal from the mobile communications device, in which that delivery control device is adapted to send an availability signal to said remote command device comprising delivery outlet availability data, and in which said remote command device is adapted to forward said delivery outlet availability data to said mobile communications device.

10. The apparatus for the delivery of the fuel product as claimed in claim 8 in which the delivery control device comprises a display, and displays a reserved message on said display when in receipt of said reservation signal.

11. The apparatus for the delivery of the fuel product as claimed in claim 9 in which said remote command device comprise a database of delivery outlet groups comprising delivery outlet group location data, in which the mobile communications device comprises a location determination device and is adapted to allow for determined device location data to be included in a search request signal, and in which said remote command device is adapted to send delivery outlet group location data relevant to said determined device location data to said mobile communications device upon receipt of said search request signal.

12. The apparatus for the delivery of the fuels product as claimed in claim 1, wherein the plurality of fuel delivery outlets each comprise a unique identifier, in which said apparatus comprises a database of said plurality of fuel delivery outlets, in which said mobile communications device is adapted to allow for a unique identifier to be inputted and included in a reservation request signal, and in which the remote command device is adapted to send a reservation signal to the fuel delivery outlet comprising that unique identifier when in receipt of said reservation request signal from said mobile communications device.

13. The apparatus for the delivery of the fuel product as claimed in claim 12 in which said plurality of fuel delivery outlets are arranged in groups, each of which is controlled by a delivery control device comprising a unique site identifier, in which said mobile communications device is adapted to allow for a unique site identifier to be inputted and included in a site request signal, in which the remote command device is adapted to send an availability request signal to that fuel delivery control device when in receipt of said site request signal from the mobile communications device, in which that delivery control device is adapted to send an availability signal to said remote command device comprising delivery outlet availability data, and in which said remote command device is adapted to forward said delivery outlet availability data to said mobile communications device.

14. The apparatus for the delivery of the fuel product as claimed in claim 13 in which said remote command device comprises a database of delivery outlet groups comprising delivery outlet group location data, in which the mobile communications device comprises a location determination device and is adapted to allow for determined device location data to be included in a search request signal, and in which said remote command device is adapted to send delivery outlet group location data relevant to said determined device location data to said mobile communications device upon receipt of said search request signal.

15. The apparatus for the delivery of fuel product as claimed in claim 14 in which the delivery control device comprises a display, and displays a reserved message on said display when in receipt of said reservation signal.

16. A method of activating a fuel pump at a site comprising a plurality of fuel pumps, the method comprising:
  receiving a request from a mobile device for a user to purchase fuel from the fuel pump, the request comprising a location of the mobile device;
  confirming that the mobile device is geographically located at the site;
  determining an availability of each of the fuel pumps and providing the availability to the mobile device;
  receiving a selection of the fuel pump from the available fuel pumps from the mobile device;
  receiving an activation request signal from the mobile device, the activation request signal indicating that a value of fuel has been purchased; and
  sending an activation signal to a remote server associated with the selected fuel pump, wherein the remote server activates the fuel pump upon receipt of the activation signal.

17. The method of claim 16, wherein the confirming comprises receiving GPS coordinates from the mobile device.

18. The method of claim 17, wherein the confirming comprises querying a database of a plurality of locations of fuel pump sites.

19. The method of claim 16, further comprising determining one of the plurality of fuel pumps that a vehicle corresponding to the mobile device is located alongside of.

* * * * *